US009610508B2

(12) United States Patent
Maehiro

(10) Patent No.: US 9,610,508 B2
(45) Date of Patent: *Apr. 4, 2017

(54) METHOD AND APPARATUS FOR JOINING ELECTRONIC CONFERENCE

(71) Applicant: KABUSHIKI KAISHA SQUARE ENIX, Tokyo (JP)

(72) Inventor: Kazutoyo Maehiro, Newton, MA (US)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,018

(22) Filed: Dec. 21, 2015

(65) Prior Publication Data

US 2016/0112353 A1    Apr. 21, 2016

Related U.S. Application Data

(63) Continuation of application No. 13/944,379, filed on Jul. 17, 2013, now Pat. No. 9,246,855, which is a
(Continued)

(30) Foreign Application Priority Data

Nov. 17, 2000    (JP) ................................. 2000-351911

(51) Int. Cl.
*A63F 13/87*    (2014.01)
*A63F 13/40*    (2014.01)
(Continued)

(52) U.S. Cl.
CPC .............. *A63F 13/87* (2014.09); *A63F 13/12* (2013.01); *A63F 13/40* (2014.09); *A63F 13/73* (2014.09);
(Continued)

(58) Field of Classification Search
None
See application file for complete search history.

(56) References Cited

U.S. PATENT DOCUMENTS 5,574,934 A    11/1996    Mirashrafi et al.
5,689,641 A    11/1997    Ludwig et al.
(Continued)

FOREIGN PATENT DOCUMENTS

EP    0898424    2/1999
JP    8-163524    6/1996
(Continued)

OTHER PUBLICATIONS

"Easy Communication is All the Rage. Go with Instant Message!", Internet Magazine, Impress Corp., No. 58, pp. 206-221, Nov. 1, 1999.
(Continued)

*Primary Examiner* — Azizul Choudhury
(74) *Attorney, Agent, or Firm* — Greenblum & Bernstein, P.L.C.

(57) ABSTRACT

According to the present invention, even while a chat opening process is in progress, users can join chats by means of a simple procedure from a video game machine. Once a chat has been opened, an invitation signal can further be transmitted to other chat guests. A video game machine of an expected guest receiving the invitation signal displays a screen prompting the guest to enter the chat room, and the expected guest can join the chat by transmitting an enter room signal to a database. At this time, a chat answer signal indicating that the expected guest accepts the invitation from a chairman is transmitted from the expected guest to the chairman.

22 Claims, 7 Drawing Sheets

Related U.S. Application Data continuation of application No. 09/820,530, filed on Mar. 29, 2001, now Pat. No. 8,554,842.

(51) Int. Cl.

| | | |
|---|---|---|
| *A63F 13/73* | (2014.01) | |
| *A63F 13/79* | (2014.01) | |
| *A63F 13/30* | (2014.01) | |
| *H04L 12/18* | (2006.01) | |
| *H04L 12/58* | (2006.01) | |
| *H04L 29/06* | (2006.01) | |
| *H04N 7/15* | (2006.01) | |
| *A63F 13/31* | (2014.01) | |
| *A63F 13/00* | (2014.01) | |

(52) U.S. Cl.
CPC .......... *A63F 13/79* (2014.09); *H04L 12/1813* (2013.01); *H04L 12/1818* (2013.01); *H04L 51/04* (2013.01); *H04L 65/1043* (2013.01); *H04N 7/15* (2013.01); *A63F 13/00* (2013.01); *A63F 13/31* (2014.09); *A63F 2300/572* (2013.01); *H04L 29/06034* (2013.01); *H04L 29/06401* (2013.01)

(56) References Cited

U.S. PATENT DOCUMENTS

| | | | |
|---|---|---|---|
| 5,758,079 A | 5/1998 | Ludwig et al. | |
| 5,793,365 A | 8/1998 | Tang et al. | |
| 5,796,393 A | 8/1998 | MacNaughton et al. | |
| 5,802,294 A | 9/1998 | Ludwig et al. | |
| 5,854,893 A | 12/1998 | Ludwig et al. | |
| 5,854,898 A | 12/1998 | Riddle | |
| 5,867,654 A | 2/1999 | Ludwig et al. | |
| 5,896,500 A | 4/1999 | Ludwig et al. | |
| 5,915,091 A | 6/1999 | Ludwig et al. | |
| 6,223,177 B1 | 4/2001 | Tatham et al. | |
| 6,346,952 B1 | 2/2002 | Shtivelman | |
| 6,412,073 B1 | 6/2002 | Rangan | |
| 6,430,177 B1 | 8/2002 | Luzeski et al. | |
| 6,490,687 B1 | 12/2002 | Nagai | |
| 6,519,629 B2 | 2/2003 | Harvey et al. | |
| 6,564,261 B1 | 5/2003 | Gudjonsson et al. | |
| 6,651,086 B1 | 11/2003 | Manber et al. | |
| 6,708,172 B1 | 3/2004 | Wong et al. | |
| 6,807,562 B1 | 10/2004 | Pennock et al. | |
| 7,056,217 B1 | 6/2006 | Pelkey et al. | |
| 7,174,517 B2 | 2/2007 | Barnett et al. | |
| 7,177,905 B1 | 2/2007 | Slutsman et al. | |
| 7,216,144 B1 | 5/2007 | Morris et al. | |
| 7,240,093 B1 * | 7/2007 | Danieli ................. | A63F 13/12 463/35 |
| 2002/0002586 A1 | 1/2002 | Rafal et al. | |
| 2006/0010201 A1 | 1/2006 | Roskowski et al. | |
| 2009/0106416 A1 | 4/2009 | Cohen et al. | |

FOREIGN PATENT DOCUMENTS

| | | |
|---|---|---|
| JP | 8-297637 | 11/1996 |
| WO | 00/68864 | 11/2000 |

OTHER PUBLICATIONS

Asakawa. S, "New Business Style Created by Sametime, Searching for Real-time Collaboration", Lotus Notes Magazine, Japan Softbank Publishing Inc., vol. 32, pp. 44-56; Jun. 13, 1999.

"Introduction to Battlenet", Battlenet, Nov. 2000.

Cobbley, David A., "Multipoint LAN Conferencing," Feb. 22, 1993, Hillsboro, Oregon, pp. 502-506.

\* cited by examiner

| HEADER | | ~207 |
|---|---|---|
| USER NAME | | ~501 |
| USER ID | | ~502 |
| COMMAND | INVITATION | ~511 |
|    CHAT NAME | A B C | ~512 |
|    CHAT PASSWORD | * * * * | ~513 |
|    CHAT ID | ####-## | ~514 |
| MESSAGE | | ~521 |
|    TITLE | | |
|    ×× × | | |
| ⋮ | ⋮ | |

FIG.5

| HEADER | | — 205, 211 |
|---|---|---|
| USER NAME | | — 601 |
| USER ID | | — 602 |
| USER PASSWORD | | — 603 |
| COMMAND | ENTER ROOM | — 611 |
|    CHAT NAME | A B C | — 512 |
|    CHAT PASSWORD | * * * * | — 513 |
|    CHAT ID | ####-## | — 514 |

FIG.6

METHOD AND APPARATUS FOR JOINING ELECTRONIC CONFERENCE

CROSS-REFERENCE TO RELATED APPLICATION

This is a continuation application of U.S. patent application Ser. No. 13/944,379, filed Jul. 17, 2013, which is a continuation of U.S. patent application Ser. No. 09/820,530, filed Mar. 29, 2001 and now U.S. Pat. No. 8,554,842, which claims priority to Japanese Application No. 2000-351911, filed Nov. 17, 2000. The disclosures of these documents, including the specifications, drawings and claims, are incorporated herein by reference in their entirety.

BACKGROUND OF THE INVENTION

Field of the Invention

The present invention relates to a method and apparatus for joining an electronic conference, and particularly to a method and apparatus for joining an electronic conference by using a simple procedure from a video game machine.

Description of the Related Art

Video game machines with an Internet connection function can receive various services via servers of ISPs (Internet Service Providers). With these new services, for example, game software is distributed to video game machines and users can play battle games via a network. On the other hand, other new services can be provided by combining services relating to games with services such as electronic mail and conferences (hereafter referred to as "chats") which are conventionally provided on the Internet.

In a battle game, users playing the game via a network may be opponents or allies. If users who have become acquainted through a game have means for communication, they can exchange information on games to increase enjoyment such of games. Further, if not only one-on-one battle games but also games that can be joined by many players are available, information exchanged based on chats are effective.

A problem with conventional video game machines, however, is that they have the Internet connecting function but no application program for electronic mail or chats. thus requiring a separate general-purpose computer in order to send electronic mail or have chats.

Further, the conventional video game machines require various procedures with an ISP, which are cumbersome both to a chat chairman and to guests. Moreover, if new guests are invited while a chat opening process is in progress, complicated procedures are required, thus making it difficult to increase chat guests.

SUMMARY OF THE INVENTION

It is an object of the present invention to provide a method and apparatus for joining an electronic conference which method and apparatus allow users to join a chat by means of a simple procedure from a video game machine even while the chat opening process is in progress.

To attain this object, an electronic conference joining method is provided by which a chairman who opens an electronic conference sets a particular area on a database and by which guests who join the electronic conference send a request for access to the area to a server from the guests' terminals. The chairman's terminal stores setup information for setting the area, in a storage section, creates an invitation message containing the setup information stored in the storage section. The chairman's terminal gives an instruction for transmission of the invitation message, and transmits an invitation signal containing the setup information to the guests' terminals depending on the instruction. The guests' terminals receives the invitation signal and obtain the setup information, create an access request signal containing the setup information, and transmit to the server, the access request signal in response to the guests' instruction.

The chairman's terminal may also receive an opening response signal from the server. The signal indicates that the area has been set in the database, in that the opening response signal contains an ID number for allowing the server to identify the area of the database. The chairman's terminal may also transmit the invitation signal containing the ID number, and add the ID number contained in the invitation signal to the access request signal.

A third invention is the first or second invention characterized in that the setup information contains at least one of a name of the electronic conference and a code number for accessing the area of the database.

A fourth invention is an electronic conference joining system by which a chairman who opens an electronic conference sets a particular area on a database and by which guests who join the electronic conference send a request for access to the area to a server from the guests' terminals. The chairman's terminal comprises a storage for storing setup information for setting the area and an invitation message creator for creating an invitation message containing the setup information stored in the storage. The chairman's terminal also indicates an instruction device for giving an instruction for transmission of the invitation message created by the invitation message creator, and an invitation signal transmitter for transmitting an invitation signal containing the setup information to the guests' terminals depending on the Instruction from the instruction device. The guests' terminals include a setup information retriever for receiving the invitation signal and obtaining the setup information, an access request signal source for creating an access request signal containing the setup information obtained by the setup information retriever, and a request signal transmitter for transmitting to the server, the access request signal created at the access request signal source in response to the guests' instruction.

The chairman's terminal may also include a receiver for receiving an opening response signal from the server. The signal indicates that the area has been set in the database, in that the opening response signal contains an ID number for allowing the server to identify the area of the database. Moreover, the invitation signal transmitter may transmit the invitation signal containing the ID number, and in that the access request signal source may add the ID number contained in the invitation signal to the access request signal. The setup information may contain either a name of the electronic conference or a code number for accessing the area of the database.

According to another of the present invention, a recording medium has programs recorded thereon. The programs control terminals in an electronic conference joining system by which a chairman who opens an electronic conference sets a particular area on a database and by which guests who join the electronic conference send a request for access to the area to a server from the guests' terminals. The recording medium is readable by a computer and has to control the chairman's terminal, a program recorded thereon for causing the computer to execute storing setup information for setting the area, in a storage section. The program also cause the computer to create an invitation message containing the setup information stored in the storage section, give an instruction for transmission of the invitation message, and transmits an invitation signal containing the setup information to the guests' terminals depending on the instruction. The recording medium has, to control the guests' terminals, a program recorded thereon for causing the computer to receive the invitation signal and obtain the setup information. The computer also creates access request signal containing the setup information, and transmits to the server, the access request signal in response to the guests' instruction.

According to another aspect of the present invention, a program is provided for controlling terminals in an electronic conference joining system by which a chairman who opens an electronic conference sets a particular area on a database and by which guests who join the electronic conference send a request for access to the area to a server from the guests' terminals. The program causes to control the chairman's terminal, a computer to store setup information for setting the area, in a storage section and create an invitation message containing the setup information stored in the storage section. The computer also gives an instruction for transmission of the invitation message, and transmits an invitation signal containing the setup information to the guests' terminals depending on the instruction. The program causes to control the guests' terminals, the computer to receive the invitation signal and obtain the setup information. The computer also creates an access request signal containing the setup information, and transmits to the server, the access request signal in response to the guests' instruction.

As described above, the present invention allows users to join a chat by using a simple procedure from a video game machine even while a chat opening process is in progress.

The above and other objects, effects, features and advantages of the present invention will become more apparent from the following description of embodiments thereof taken in conjunction with the accompanying drawings.

BRIEF DESCRIPTION OF THE DRAWING

FIG. 5 is a view showing an example of a communication data format for invitation to a chat in the electronic conference opening, according to the present invention;

FIG. 6 is a view showing an example of a communication data format for entering a chat in the electronic conference opening, according to the present invention.

DETAILED DESCRIPTION OF PREFERRED EMBODIMENTS

Embodiments of the present invention will be described below in detail with reference to the drawings.

Figure 1:
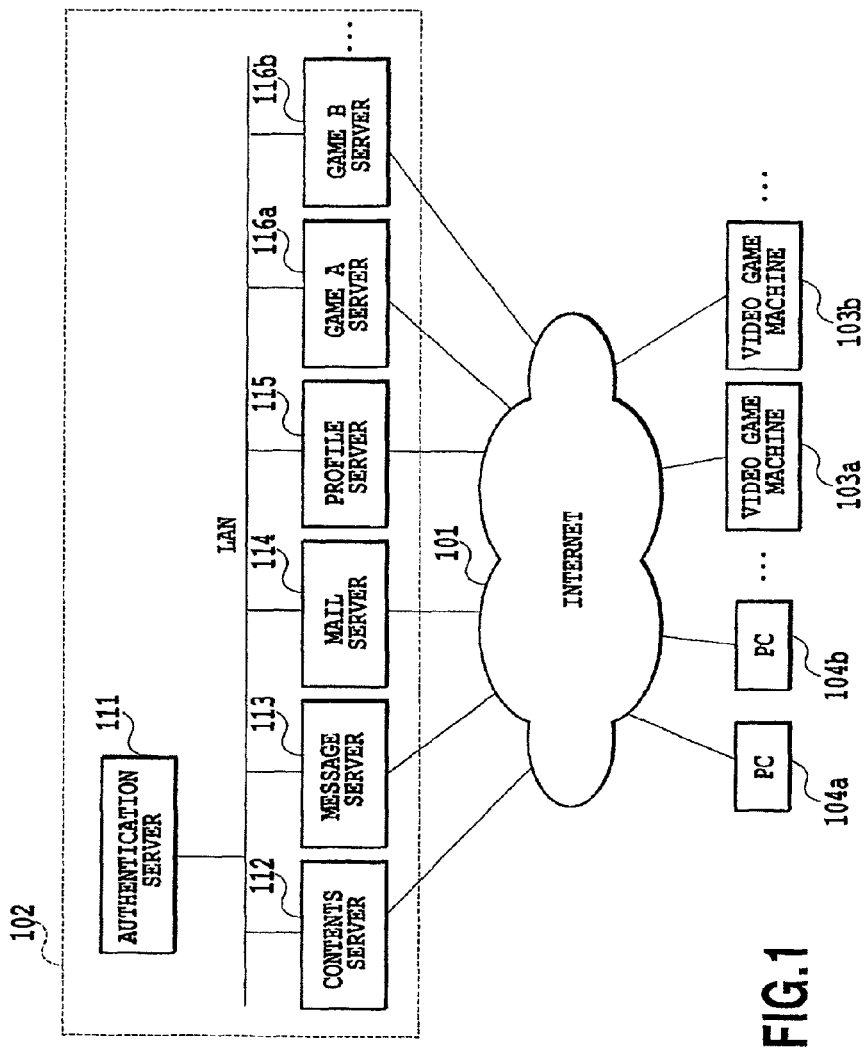
FIG. 1 is a schematic view showing an example of a system configuration for providing electronic conference opening, according to the present invention.

FIG. 1 shows an example of a system configuration for providing electronic conference opening according to the present invention. The Internet 101 has a server of an ISP, video game machine 103a and 103b, and general-purpose components 104a and 104b connected thereto.

The ISP servers 102 comprises multiple servers including an authentication server 111 for managing accounts to authenticate users, a content server 112 for providing services for allowing users to listen to and view content such as sounds or videos, a message server 113 for providing environments for chats or messengers, a mail server 114 for providing electronic mail services, a profile server 115 for managing users' profiles, and game servers 116a and 116b for providing game environments, all of these servers are connected to the ISP server via a LAN 117.

With this configuration, a user accesses the authentication server 111 from the video game machine 103a or 103b or the general-purpose computer 104a or 104b via the Internet 101, to have the user authenticated. The servers 102 transmit a menu screen to the authenticated user. The user selects one of services displayed on the menu screen to connect the video game machine 103a or 103b or the general-purpose computer 104a or 104b to one of the groups of servers depending on the service, so that the user can receive the service.

Figure 2:
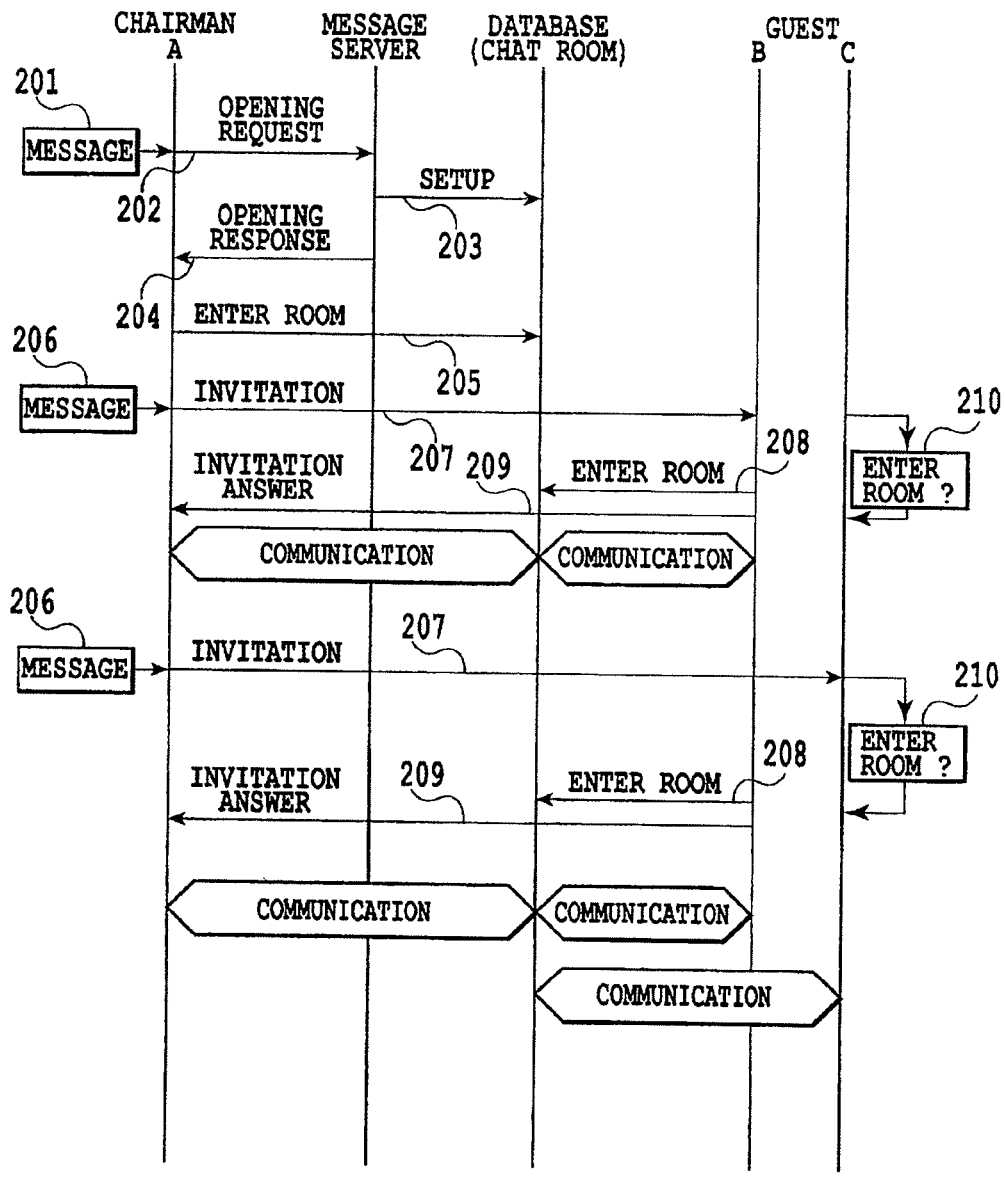
FIG. 2 is a sequence diagram showing an example of the electronic conference opening, according to the present invention.

FIG. 2 shows an example of electronic conference opening of the present invention. A user who desires to open a chat creates a message 201 for opening a chat, on the video game machine 103a. When this message is sent, a chat opening request signal 202 is transmitted to the message server 113. The latter transmits a setup signal 203 for opening the desired chat room to a database in the group of servers and returns a chat opening response signal 204 to the user. The opening of a chat refers to an operation performed by the message server 113 to set a specified area in the database and grant accesses only to particular users, that is, chat guests.

Upon receiving the chat opening response signal 204, the user can enter (join) the chat room by transmitting an enter room signal 205 to the database. The entry to a chat room refers to an operation of having the user's access checked by the message server 113 to access a predetermined area of the database.

Further, a message 206 for invitation to the chat which is transmitted to the chat guests is displayed based on the created message 201, and an invitation signal 207 is transmitted to all the guests. The video game machine 103b of an expected guest receiving the invitation signal 207 displays a screen 210 prompting the guest to enter the chat room, and the expected guest can join the chat by transmitting a enter room signal 208 to the database. At this time, an invitation answer signal 209 indicating that the guest accepts the chairman's invitation is transmitted from the expected guest to the chairman. The invitation to a chat refers to an operation of granting a guest access to an opened chat room and prompting the guest to join the chat.

After a chat has been opened, the invitation signal 207 can also be transmitted to new chat guests. The video game machine 103c, not shown in FIG. 1, of an expected guest receiving the invitation signal 207 displays the screen 210 prompting the guest to enter the chat room, and the expected guest can join the chat by transmitting the enter room signal 208 to the database. At this time, the invitation answer signal 209 indicating that the guest accepts the chairman's invitation is transmitted from the expected guest to the chairman.

Figure 3:
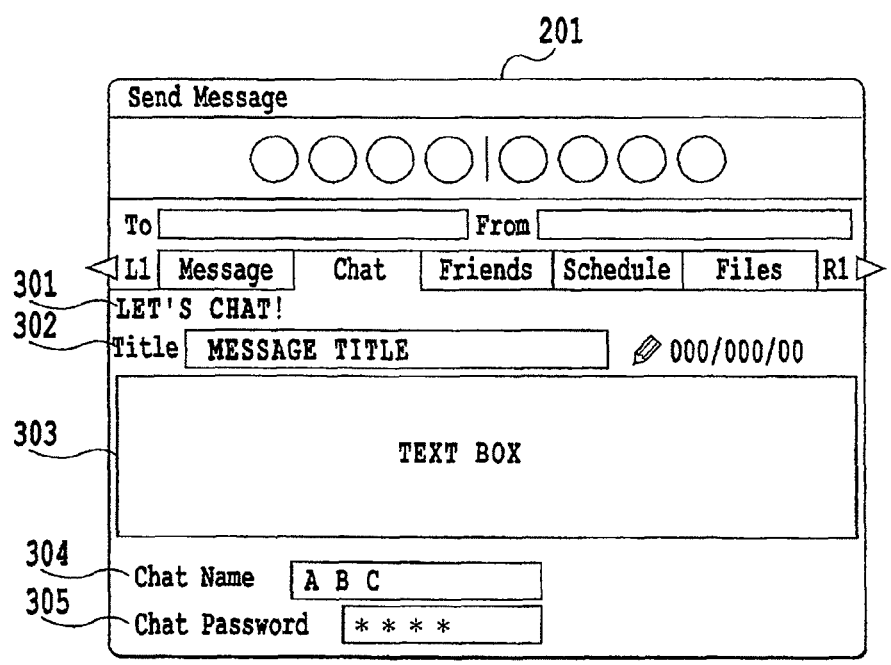
FIG. 3 is a view showing an example of a message for opening a chat in the electronic conference opening, according to the present invention.

FIG. 3 shows an example of a message for opening a chat in the electronic conference opening of the present invention. This corresponds to the chat opening message 201 shown in FIG. 2 and is created and transmitted to the message server 113 by the chairman. The contents of the chat opening message 201 request the message server 113 to open the chat room and to transmit the invitation message to the expected guests.

The chat opening message 201 has a category 301 indicative of a type of message, and a message title 302 and a text box 303 that are required to transmit the invitation message to the expected guests. The message 201 also has input columns for a chat name 304 and a chat password 305 which are required to request the message server 113 to open the chat room.

Figure 4:
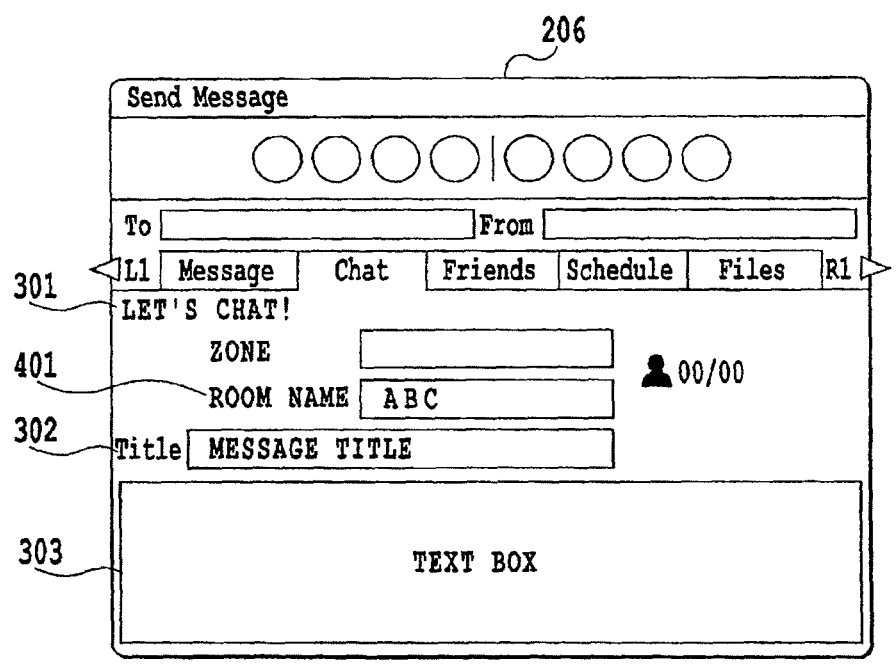
FIG. 4 is a view showing an example of a message for invitation to a chat in the electronic conference opening, according to the present invention.

FIG. 4 shows an example of a chat opening data signal format in the electronic conference opening of the present invention. This corresponds to the invitation message 206 shown in FIG. 2 and is created by the video game machine 103a based on the chat opening message 201 created by the chairman. The setup information input to create the chat opening message 201 has been stored and is used to create the invitation message 206. The invitation message 206 differs from the chat opening message 201 shown in FIG. 3 in that the chat name 304 input through the chat opening message 201 is displayed as a room name 401 in the invitation message 206. The chat password 305 will be described later.

The invitation message 206 can be invoked while the chat opening process is in progress. The user can invoke and edit the invitation message 206 by performing an operation required to invoke the message or selecting guests from an address book while the chat opening process is in progress. Then, after the chat has been opened, the invitation signal 207 can be transmitted to other guests.

FIG. 5 shows an example of an invitation data signal format in the electronic conference opening of the present invention. This data signal format corresponds to the invitation signal 207 shown in FIG. 2 and is created by the video game machine 103a based on the invitation message 206. The video game machine 103a sets a user name 501 and a user ID 502 of the chairman which have already been registered. An "invitation" command 511 is generated by obtaining a chat name 512 and a chat password 513 from the contents of the chat opening message 201 and obtaining a chat ID 514 from the contents of the chat opening response signal 204.

The chat password 513 is set by obtaining it from the chat password 305 in the chat opening message 201 but is not displayed in the invitation message 206 shown in FIG. 4. The chat ID 514 is also not displayed. Upon receiving the invitation message 207, the video game machines 103b and 103c display the screen 210 prompting the guests to enter the chat room and create the Enter Room signal 208. The screen 210 prompting the guests to enter the chat room also does not display the chat password 513 or the chat ID 514. That is, the chat password 513 and the chat ID 514 are recognized by the video game machines 103a to 103c during the exchange of the signals but are not communicated to the guests through the screen. When cumbersome procedures required to set a chat are thus omitted, users can open and join a chat by means of a simple procedure from a video game machine.

FIG. 6 shows an example of a data signal format for entering a chat room in the electronic conference opening of the present invention. This data signal format corresponds to the enter room signals 205 and 208 shown in FIG. 2. Here, the enter room signal 208 will be explained. When the guest selects "Enter Room" in the screen 210 prompting the guests to enter the chat room, the video game machines 103b and 103c create and transmit the enter room signal 208 to the database of the group of message servers 113. The video game machine 103b sets a user name 601, a user ID 602, and a user password 603 of the chairman which have already been registered. An "Enter Room" command 611 is generated by obtaining the chat name 512, the chat password 513, and the chat ID 514 from the contents of the invitation signal 207.

According to this embodiment, even while the chat opening process is in progress, the video game machine 103a can invoke the invitation message 206 so that the invitation signal 207 can be transmitted based on this message, thereby eliminating the need for cumbersome procedures for inviting guests. Further, the guests can join chats without any cumbersome procedure because the video game machines 103b and 103c generate the enter room signal 208 from the contents of the invitation signal and transmit this signal.

Figure 7:
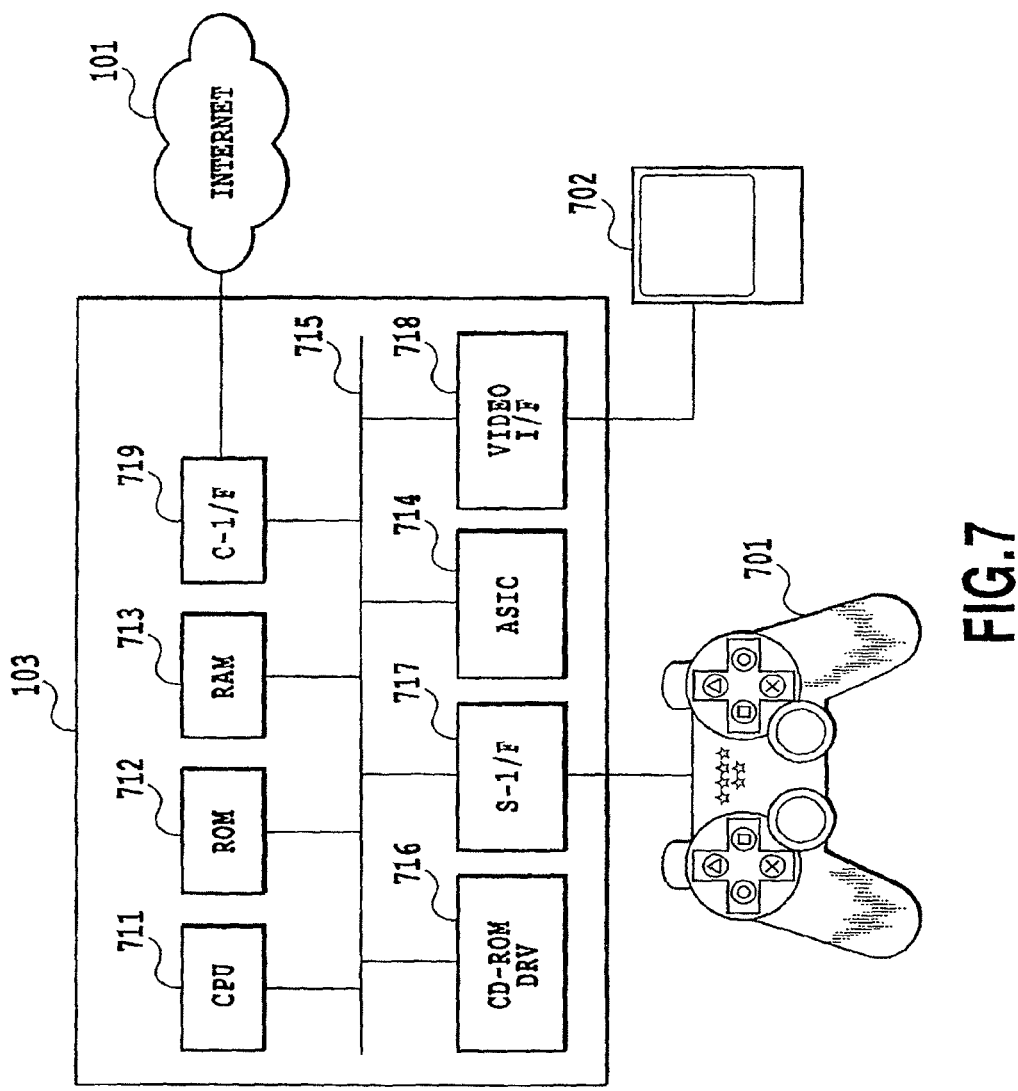
FIG. 7 is a block diagram showing an example of a video game machine having the electronic conference opening, mounted therein.

FIG. 7 shows an example of a video game machine having the electronic conference opening ability of the present invention mounted therein. The video game machine 103 has a CPU 711 for controlling the entire machine, a ROM 712 storing game programs and a program for the electronic conference opening of the present invention, a RAM 713 as a temporary storage area, and an Application Specific IC (ASIC) 714 for processing images, which are connected together via a bus 715.

A CD-ROM drive 716 for loading the game programs and the program for the electronic conference opening of the present invention, from the CD-ROM storing these programs, a serial interface 717 connected to the game controller 701, a video interface 718 connected to a TV monitor 702, and a communications interface 719 for connection to the Internet 101 are also connected to the bus 715.

Of course, the present invention is achieved by causing the video game machine or general-purpose computer to read and execute program code of software from the storage medium storing these program codes, the software implementing the electronic conference opening of the present invention. The storage medium for supplying the program code may include, for example, a floppy disk, a hard disk, a photo-electromagnetic disk, an optical disk, a CD-ROM, a CD-R, a magnetic tape, a non-volatile memory card, and a ROM.

The electronic conference opening of the present invention is applicable not only to standalone general-purpose computers but also to a client server system including a group of computers The present invention has been described in detail with respect to preferred embodiments, and it will now be apparent from the foregoing to those skilled in the art that changes and modifications may be made without departing from the invention in its broader aspects. It is the intention, therefore, in the appended claims to coverall such changes and modifications that fall within the true spirit of the invention.

What is claimed is:

1. An electronic chat joining method, comprising:
  requesting, by a chairman video game terminal via a request that includes setup information that is input to the chairman video game terminal, a server to open a chat, the server opening the chat by setting an area of a database for storing chat messages;

storing the setup information, before the server sets the area of the database, in a storage of the chairman video game terminal, the setup information being usable by the chairman video game terminal for creating an invitation message that provides access to the area of the database;

creating, by the chairman video game terminal and while the server is setting the area of the database, the invitation message comprising the setup information that is stored in the storage of the chairman video game terminal;

giving, by the chairman video game terminal, an invitation instruction for transmission of the invitation message;

creating, at the chairman video game terminal and not by the server, an invitation data signal that is based on the invitation message and that comprises the setup information;

initiating, by the chairman video game terminal, transmission of the invitation data signal comprising the setup information from the chairman video game terminal to the server based on the invitation instruction;

receiving, by the guest video game terminal, the invitation data signal from the server;

obtaining, by the guest video game terminal, the setup information from the invitation data signal;

creating, by the guest video game terminal, an access request signal based on the setup information;

transmitting, from the guest video game terminal to the database, the access request signal created by the guest video game terminal in response to the guest video game terminal receiving a guest instruction, wherein the setup information is not visible on the guest video game terminal, and wherein the setup information includes a password that is communicated from the chairman video game terminal to at least one of the server and the guest video game terminal without modification and that initiates and authenticates access to the area of the database by the guest video game terminal.

2. The electronic chat joining method according to claim 1, wherein the setup information comprises at least one of a name of an electronic conference and a code number for accessing the area of the database.

3. The electronic chat joining method according to claim 1, further comprising:

receiving, by the chairman video game terminal, an opening response signal from the server, the opening response signal indicating that the area of the database has been set, the opening response signal comprising an ID number for allowing the server to identify the area of the database;

transmitting the invitation data signal containing the ID number from the chairman video game terminal to the server; and adding the ID number contained in the invitation data signal to the access request signal.

4. The electronic chat joining method according to claim 3, wherein the setup information comprises at least one of a name of the electronic conference and a code number for accessing the area of the database.

5. The electronic chat joining method according to claim 3, further comprising generating a command for inviting selected guests by obtaining an alias name and the password from a chat opening message and obtaining the ID number from the opening response signal.

6. The electronic chat joining method according to claim 5, wherein the password and the ID number are recognized by the guest video game terminal during an exchange of signals but are not communicated to the guest through the screen.

7. The electronic chat joining method according to claim 1, further comprising:

creating, by the chairman video game terminal, a chat opening message for receiving the setup information, the chat opening message comprising a type of the chat opening message, a message title, and a text box, which are required to transmit the invitation message to the server;

giving an opening instruction from the chairman video game terminal for transmission of the chat opening message; and transmitting, from the chairman video game terminal, a chat opening signal based on the opening instruction.

8. The electronic chat joining method according to claim 7, wherein the chat opening message further comprises input columns for an alias name of the chairman and the password which are required to request the server to open an electronic conference room.

9. The electronic chat joining method according to claim 7, wherein the input columns for the alias name in the chat opening message are displayed as an electronic conference room name in the invitation message.

10. The electronic chat joining method according to claim 7, further comprising:

transmitting a command for inviting selected guests from the chairman video game terminal; and editing the invitation message by selecting guests from an address book while the chat opening process is in progress.

11. The electronic chat joining method according to claim 1, further comprising:

transmitting, from the guest video game terminal to the chairman video game terminal, an invitation answer signal in response to the guest video game terminal receiving the guest instruction.

12. The electronic chat joining method according to claim 1, wherein the chairman video game transmits the setup information to the server when requesting the server to set the area of the database for storing chat messages.

13. An electronic chat joining system, comprising:

a chairman video game terminal including:

a chairman terminal communications interface that requests a server, via setup information that is input to said chairman video game terminal, to open a chat, said server opening said chat by setting an area of a database for storing chat messages;

a chairman terminal memory that stores, before said server sets said area of said database, said setup information being useable by said chairman video game terminal for creating an invitation message that provides access to said area of said database;

a chairman terminal processor that creates, at the chairman video game terminal and not by the server, while said server is setting said area, said invitation message comprising said setup information that is stored in said chairman terminal memory;

said chairman terminal processor that issues an invitation instruction for transmission of said invitation message;

said chairman terminal processor that creates an invitation data signal that is based on the invitation message and that comprises the setup information; and said chairman terminal communications interface that initiates transmission of said invitation data signal comprising said setup information to the server in response to said invitation instruction from said chairman terminal processor; and said guest video game terminal including:

a guest terminal communications interface that receives said invitation data signal from the server and obtains said setup information;

a guest terminal processor that creates an access request signal comprising said setup information obtained by said setup information retriever; and said guest terminal communications interface that transmits, to said database, said access request signal created by said access request signal source in response to said guest video game terminal receiving a guest instruction, wherein said setup information is not visible on said guest video game terminal, and wherein said setup information includes a password that is communicated from said chairman video game terminal to at least one of the server and the guest video game terminal without modification and that initiates and authenticates access to the area of the database by the guest video game terminal.

14. The electronic chat joining system according to claim 13, wherein said setup information comprises at least one of a name of an electronic conference and a code number for accessing said area of said database.

15. The electronic chat joining system according to claim 13, wherein said chairman terminal communications interface receives an opening response signal from said server, said opening response signal indicating that said area has been set in said database, said opening response signal comprises an ID number for allowing said server to identify said area of said database, said chairman terminal communications interface transmits said invitation data signal comprising said ID number, and said guest terminal processor adds said ID number contained in said invitation data signal to said access request signal.

16. The electronic chat joining system according to claim 15, wherein said setup information comprises at least one of a name of an electronic conference and a code number for accessing said area of said database.

17. The electronic chat joining system according to claim 13, wherein said guest terminal communications interface transmits, to said chairman video game terminal, an invitation answer signal in response to said guest video game terminal receiving said guest instruction.

18. The electronic chat joining system according to claim 13, wherein said chairman terminal communications interface transmits said setup information to said server when requesting said server to set said area of said database for storing chat messages.

19. A non-transitory storage medium having programs recorded thereon, comprising:

a chairman code segment that causes a chairman video game terminal to:

request a server to open a chat, the request including setup information inputted to the chairman video game terminal, the server opening the chat by setting an area of a database for storing chat messages;

store, before the server sets the area of the database, the setup information in a storage, the setup information being useable by the chairman video game terminal for creating an invitation message that provide access to the area of the database to be set by the server;

create, while the server is setting the area of the database, the invitation message comprising the setup information that is stored in the storage of the chairman video game terminal;

give an invitation instruction for transmission of the invitation message;

create, at the chairman video game terminal and not by the server, an invitation data signal that is based on the invitation message and that comprises the setup information; and initiate transmission of the invitation data signal containing the setup information to the server in response to the invitation instruction; and a guest code segment that causes the guest video game terminal to:

receive the invitation message from the server and obtain the setup information;

create an access request signal comprising the setup information; and transmit, to the database, the access request signal in response to the guest video game terminal receiving a guest instruction, wherein the setup information is not visible on the guest video game terminal, and wherein the setup information includes a password that is communicated from the chairman video game terminal to at least one of the server and the guest video game terminal without modification and that initiates and authenticates access to the area of the database.

20. The non-transitory storage medium according to claim 19, wherein said executable chairman code segment, when executed, causes the guest video game terminal to transmit, to the chairman video game terminal, an invitation answer signal in response to the guest video game terminal receiving the guest instruction.

21. A non-transitory storage medium having programs recorded thereon, comprising:

a chairman code segment that causes a chairman video game terminal to:

open, via a request that includes setup information that is input to the chairman video game terminal, a chat by setting an area of a database for storing chat messages;

store setup information, the setup information being usable by the chairman video game terminal for creating an invitation message that provides access to the area of the database;

create, at the chairman video game terminal, the invitation message comprising the setup information that is stored in the chairman terminal memory;

issue an invitation instruction for transmission of the invitation message;

create an invitation data signal that is based on the invitation message and that comprises the setup information; and communication interface that initiates transmission of the invitation data signal comprising the setup information from the chairman video game terminal to a guest video game terminal based on the invitation instruction, and a guest code segment that causes the guest video game terminal to:

receive the invitation data signal;

obtain the setup information from the invitation data signal;

create an access request signal based on the setup information; and transmit, from the guest video game terminal to the database, the access request signal created by the guest video game terminal in response to the guest video game terminal receiving a guest instruction, wherein the setup information includes a password that is communicated from the chairman video game terminal to the guest video game terminal and that initiates and authenticates access to the area of the database by the guest video game terminal.

22. A non-transitory storage medium having programs recorded thereon, comprising:

a chairman code segment that causes a chairman video game terminal to:

set an area of a database for storing chat messages; and request a server, via setup information that is input to the chairman video game terminal, to open a chat;

a server code segment that causes the server to:

store the setup information, the setup information being usable by the server for creating a data signal;

create the data signal that includes a password and that comprises the setup information; and initiate transmission of the data signal including the password and comprising the setup information from the server to the chairman video game terminal and a guest video game terminal; and a guest code segment that causes the guest video game terminal to:

receive the data signal;

obtain the setup information from the data signal;

create an access request signal based on the setup information; and transmit, from the guest video game terminal to the database, the access request signal created by the guest video game terminal in response to the guest video game terminal receiving a guest instruction, wherein the password initiates and authenticates access to the area of the database by the guest video game terminal.

\* \* \* \* \*